United States Patent
Kreuzer

(10) Patent No.: US 6,484,606 B1
(45) Date of Patent: Nov. 26, 2002

(54) STEERING WHEEL WITH METALLIC SKELETON

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/439,512

(22) Filed: Nov. 12, 1999

(30) Foreign Application Priority Data

Nov. 12, 1998 (DE) ..................... 298 20 305 U

(51) Int. Cl.⁷ .................. G05G 1/10; B21D 53/26; B21H 1/04
(52) U.S. Cl. ......................... 74/552; 29/894.1
(58) Field of Search .................. 74/552, 558; 29/894.1

(56) References Cited

U.S. PATENT DOCUMENTS

| | | | |
|---|---|---|---|
| 1,843,676 A | * | 2/1932 | Husted ............... 74/552 |
| 1,915,769 A | * | 6/1933 | Thomas ............... 74/552 |
| 3,576,139 A | * | 4/1971 | Conterno ............. 74/552 |
| 3,714,844 A | * | 2/1973 | Tsuda ................ 74/552 |
| 3,800,620 A | * | 4/1974 | Barenyl .............. 74/552 |
| 4,359,911 A | * | 11/1982 | Eubanks et al. ....... 74/552 |
| 4,793,659 A | * | 12/1988 | Oleff et al. ......... 301/63 PW |
| 5,178,036 A | * | 1/1993 | Haldenwanger et al. .. 74/552 |
| 5,204,043 A | * | 4/1993 | Abiko et al. ......... 264/267 |
| 5,925,314 A | * | 7/1999 | Nishiguchi et al. .... 420/528 |

FOREIGN PATENT DOCUMENTS

| | | | |
|---|---|---|---|
| DE | 3035074 A1 | 4/1981 | |
| DE | 3702847 C2 | 8/1987 | |
| DE | 19806982 A1 | 9/1998 | |
| DE | 19632317 C1 | 9/1999 | |
| DE | 29915952 | * 1/2000 | ............ 74/552 |
| DE | 199 04 746 | * 8/2000 | ............ 74/552 |
| EP | 0 825 090 A | * 2/1998 | ............ 74/552 |
| FR | 2692054 | * 12/1993 | ............ 74/552 |
| JP | 63-149257 | * 6/1988 | ............ 74/552 |
| JP | 2000-142425 | * 5/2000 | ............ 74/552 |

\* cited by examiner

Primary Examiner—Vinh T. Luong
(74) Attorney, Agent, or Firm—Tarolli, Sundheim, Covell, Tummino & Szabo L.L.P.

(57) ABSTRACT

A steering wheel has a metallic skeleton that comprises a hub, a rim and spokes interconnecting said hub and said rim, said skeleton being produced by casting in one piece with a U- or V-shaped cross-section. To achieve an optimum distribution of mechanical strength in a circumferential direction, with reference to a normal position of the steering wheel in a vehicle corresponding to a straightforward vehicle travel, the rim has upper and lower portions with a cross-section that is open towards the driver side of the steering wheel, and lateral portions with a cross-section that is open towards the rear face of the steering wheel.

10 Claims, 2 Drawing Sheets

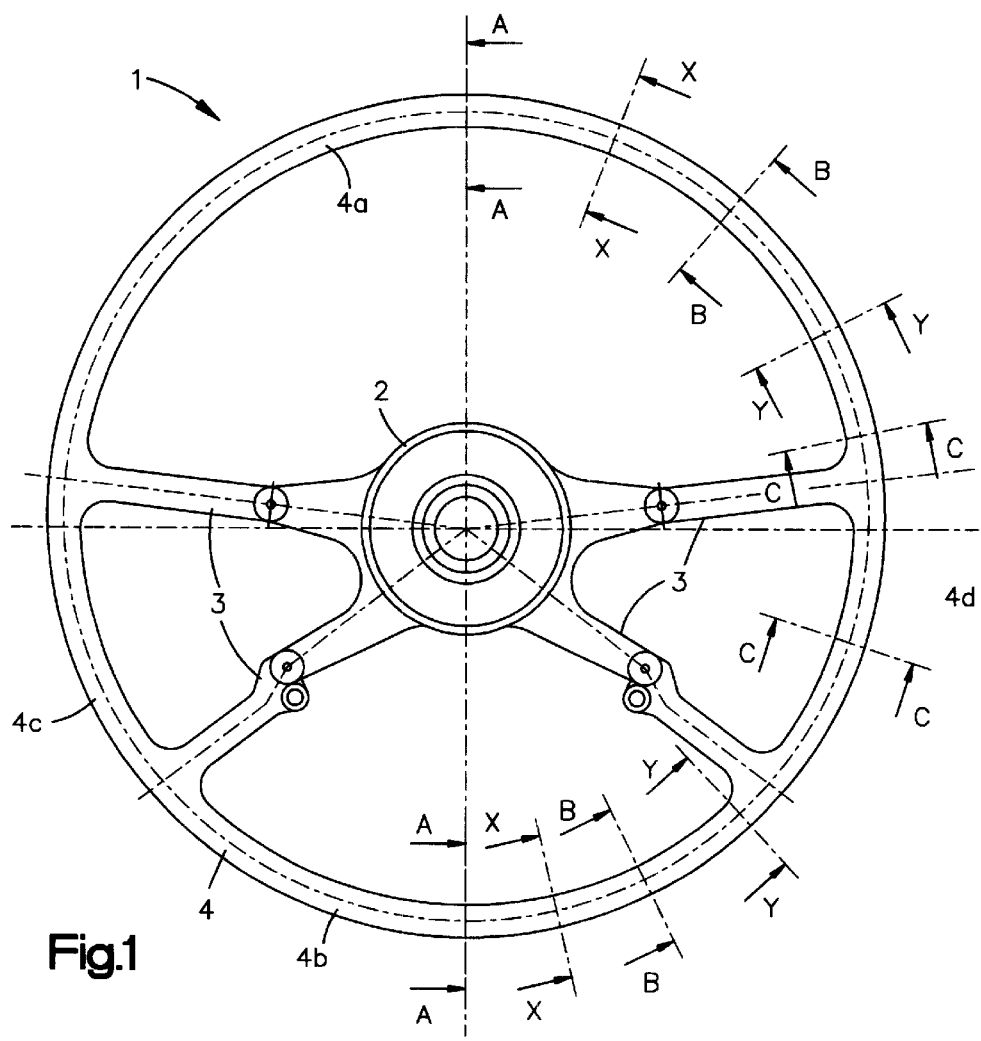
Fig.1
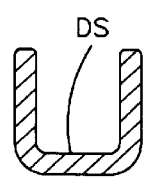
Section A-A
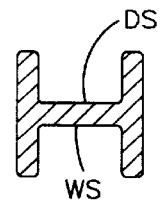
Section B-B
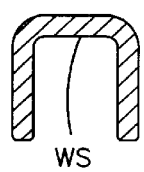
Section C-C
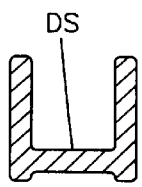
Section X-X
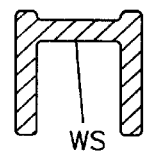
Section Y-Y

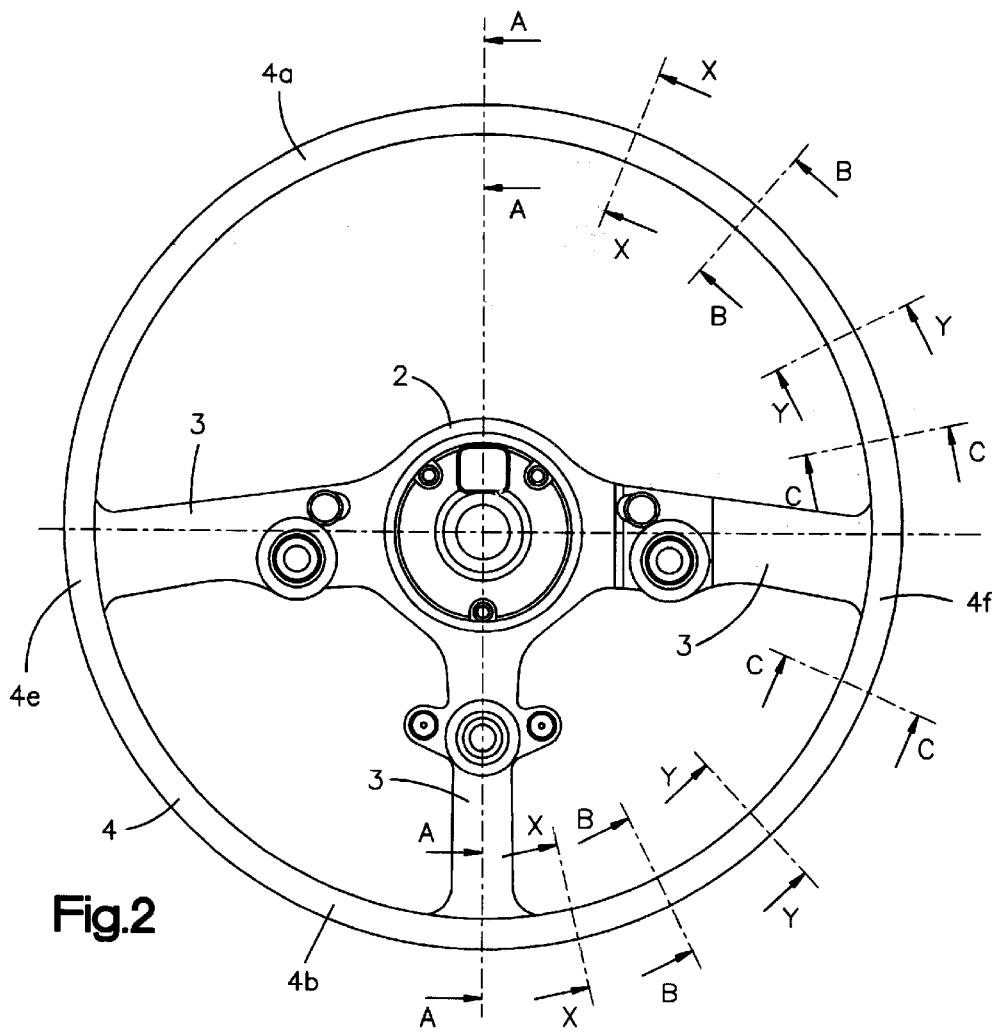
Fig.2
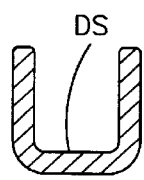
Section A-A
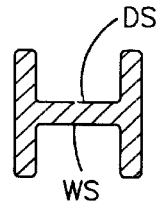
Section B-B
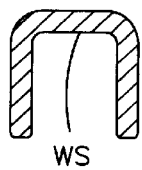
Section C-C
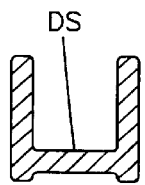
Section X-X
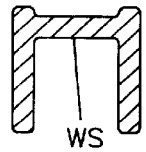
Section Y-Y

STEERING WHEEL WITH METALLIC SKELETON

TECHNICAL FIELD

The present invention relates to a steering wheel with a metallic skeleton, which comprises a hub region, spokes and a rim and which is produced by casting in one piece with a U- or V-shaped cross-section open at least in the rim region.

BACKGROUND OF THE INVENTION

In such steering wheels, the skeleton generally consists of light metal alloys based on aluminum or magnesium, which are designed in view of the requirements of die casting and also with regard to expected mechanical stresses. The steering wheels have a covering preferably of a foamed plastic that has only a minor, if any, contribution to mechanical strength. The mechanical forces are substantially taken up by the steering wheel skeleton, with not only the steering forces occurring on normal operation having to be taken into account, but also stresses that occur in the case of an impact of the vehicle driver in a vehicle crash.

On the other hand, one of course endeavors to make the steering wheel as light weight as possible and to achieve throughout as good a utilization of the material strength as possible, it still of course being taken into account that in modern steering wheels the spokes are not distributed uniformly over the circumference of the rim, so that a particularly careful structural design is necessary for the unsymmetrically supported steering wheel rim.

The production of the skeleton by casting techniques offers a large amount of design freedom, which hitherto in fact has not yet been utilized consistently enough.

From crash tests and from examination of steering wheels deformed or destroyed in accidents, it is known that portions of the steering wheel rim lying above and below in the normal position of the steering wheel are exposed to particularly high stresses with an impact.

BRIEF SUMMARY OF THE INVENTION

The present invention provides an improved steering wheel wherein the strength of the skeleton has been optimized taking into account these findings, with a minimum expenditure of material.

According to the invention, the rim of the skeleton in the upper and lower portions, has a cross-section open towards the driver side of the steering wheel and in lateral portions has a cross-section open towards the opposed rear face of the steering wheel and away from the driver side of the steering wheel.

In this way, it is achieved that the material at the open end of the U- or V-shaped section is not loaded with tension but with compression, which in the case of metal parts produced by casting technique means a substantially better utilization of the material characteristics and in particular is advantageous in the portions of the steering wheel which experience the highest deformation under forces from the driver side.

As far as the lateral portions of the steering wheel are concerned, on the other hand, maximum stress occurs on the rear face of the steering wheel, so that here the maintaining of the profile open towards the rear, i.e. away from the driver side of the steering wheel, is preferred. Between the regions open towards the front and the rear, respectively, an H-shaped section is provided, the cross-piece of which constantly changes its level, so that viewed in circumferential direction, for example a U-shaped section transforms continuously into an H-shaped section and then into an inverse U-shaped section.

By the profiling according to the invention, with a cross-sectional area of the steering wheel rim being of equal size substantially over the entire circumference, an optimum adaptation can be carried out to the various stresses occurring, in particular in the case of a crash. As a result of the optimum utilization of material, generally in addition a reduction to the overall expenditure of material can be realized.

BRIEF DESCRIPTION OF THE DRAWINGS

Further details of the invention are explained more closely with the aid of the embodiments illustrated in FIGS. 1 and 2, in which:

FIG. 1 shows an embodiment of the skeleton according to the invention for a four-spoked steering wheel in elevation and in five sections indicated in further detail; and FIG. 2 shows an embodiment of the steering wheel skeleton according to the invention for a three-spoked steering wheel in elevation and in five sections distinguished.

DETAILED DESCRIPTION OF THE PREFERRED EMBODIMENTS

In the drawings, a steering wheel is shown in a normal position in a vehicle, corresponding to a straightforward travel of the vehicle. The steering wheel skeleton 1 illustrated in FIG. 1 comprises a hub region 2, four spokes 3 and a steering wheel rim 4, the upper and lower regions of which are designated by 4a and 4b, respectively, and the lateral regions of which are designated by 4c and 4d. In the right-hand part of the elevation, various section sites are designated by capital letters. The corresponding cross-sectional shapes are illustrated as sectional views to the left of the elevation of the steering wheel skeleton. In the rim regions 4a and 4b, respectively, a U-shaped cross-section open towards the front, i.e. towards the driver side of the steering wheel, is provided in accordance with the sectional view A—A, whereas in the lateral regions of the steering wheel rim 4c and 4d, an inverse U-shaped cross-section open towards the rear, i.e. away from the driver side of the steering wheel, is realized in accordance with the sectional view C—C. In FIGS. 1 and 2, the reference letters DS designate the side of the steering wheel which is open towards the front i.e. towards the driver side. The reference letters WS designate the side of the steering wheel which is open towards the rear, i.e. opposing the driver side and towards the windshield.

Between these portions, an H-shaped cross-sectional shape in accordance with the sectional view B—B is provided, with the sectional shape A—A continuously changing into the sectional shape X—X into the sectional shape B—B and then via the sectional shape Y—Y into the sectional shape C—C. From the sectional shape C—C, the shape varies into the sectional shapes Y—Y, B—B, X—X and into the sectional shape A—A. The same change in cross-sectional shape is provided symmetrically to the left of the vertical central line of the steering wheel skeleton 1.

In the embodiment according to FIG. 2, the steering wheel skeleton is also designated by 1, the hub region by 2, the spokes by 3 and the steering wheel rim by 4. Also the upper and lower regions of the skeleton 1 are designated by 4a and 4b as in FIG. 1. The lateral regions with the spoke attachment are designated here by 4e and 4f.

With regard to the arrangement of the sectional shapes A—A, B—B, C—C, X—X and Y—Y, the same applies as stated for FIG. 1. A more extensive explanation is therefore not necessary.

The idea of the invention can, of course, also be applied to other steering wheel shapes, if care is only taken that the rim portions lying above and below in the normal position of the steering wheel have a U- or V-shaped cross-section open towards the front, i.e. toward the driver side of the steering wheel, and that the lateral rim portions have a U- or V-shaped cross-section open towards the rear, i.e. away from the driver side of the steering wheel, and that between these rim portions expediently a cross-section with H-shaped section is provided, which continuously changes into the U- or V-shaped cross-sections which are open towards the front and the rear, respectively.

What is claimed is:

1. A steering wheel with a metallic skeleton that comprises a hub, a rim and spokes interconnecting said hub and said rim, said skeleton being one piece and wherein with reference to a normal position of the steering wheel in a vehicle corresponding to a straightforward vehicle travel, the steering wheel has a driver side and a rear face opposite the driver side, and the rim has upper and lower portions with a cross-section that is one of a U-shaped and a V-shaped cross sections open towards the driver side of the steering wheel, and the rim has lateral portions with a cross-section that is one of a U-shaped and a V-shaped cross sections open away from the driver side of the steering wheel.

2. The steering wheel according to claim 1 wherein the steering wheel has a four-spoked design with lateral rim portions each having two spoke connection zones where the cross-section is continuously open away from the driver side of the steering wheel.

3. The steering wheel according to claim 1, wherein the steering wheel has a three-spoked design with lateral rim portions each having a spoke connection zone where the cross-section is open away from the driver side of the steering wheel, all other portions of the rim having a cross-section open towards the driver side of the steering wheel.

4. A steering wheel with a metallic skeleton that comprises a hub, a rim and spokes interconnecting the hub and the rim, the skeleton being one piece and wherein with reference to a normal position of the steering wheel mounted in a vehicle having a forward direction of vehicle travel, the steering wheel has a forward side facing in the forward direction of vehicle travel and a rearward side facing in a rearward direction of vehicle travel opposite the forward direction, and the rim has upper and lower portions with a cross-section that is one of a U-shaped cross-section and a V-shaped cross section having an opening facing toward the rearward direction of vehicle travel, and the rim has lateral portions with a cross-section that is one of a U-shaped cross section and a V-shaped cross-section having an opening facing toward the forward direction of vehicle travel.

5. The steering wheel according to claim 4, wherein the steering wheel has a four-spoked design with lateral rim portions each having two spoke connection zones where the opening of the cross-section faces toward the forward direction of vehicle travel.

6. The steering wheel according to claim 4, wherein the steering wheel has a three-spoke design with lateral rim portions each having a spoke connection zone where the opening of the cross-section faces toward the forward direction of vehicle travel, all other portions of the rim having a cross-section with an opening facing towards the rearward direction of vehicle travel.

7. The steering wheel according to claim 4, wherein the rim has an H-shaped cross-section in transition portions between portions where the opening of the cross-section faces toward the rearward direction of vehicle travel and portions where the opening of the cross-section faces towards the forward direction of vehicle travel.

8. The steering wheel of claim 7, wherein the transition portions have cross-sectional shapes that continuously vary from H-shape to U-shape, the H-shape having a cross-section with first and second openings, the first opening facing toward the forward direction of vehicle travel, the second opening facing toward the rearward direction of vehicle travel, the U-shape having a cross-section with an opening facing toward one of the forward direction of vehicle travel and the rearward direction of vehicle travel.

9. A steering wheel with a metallic skeleton that comprises a hub, a rim and spokes interconnecting said hub and said rim, said skeleton being one piece and wherein with reference to a normal position of the steering wheel in a vehicle corresponding to a straightforward vehicle travel, the steering wheel has a driver side and a rear face opposite the driver side, and the rim has upper and lower portions with a cross-section that is one of a U-shaped and a V-shaped cross sections open towards the driver side of the steering wheel, and the rim has lateral portions with a cross-section that is one of a U-shaped and a V-shaped cross sections open away from the driver side of the steering wheel, the rim having an H-shaped cross-section in transition portions between portions where the cross-section is open towards the driver side of the steering wheel and portions where the cross-section is open towards the rear face of the steering wheel.

10. The steering wheel of claim 9, characterized in that the transition portions have cross-sectional shapes that continuously vary from H-shape to U-shape in an upward and in a downward direction.

* * * * *